United States Patent
Shinmura et al.

(10) Patent No.: US 6,360,153 B1
(45) Date of Patent: Mar. 19, 2002

(54) CO-OPERATIVE CONTROL SYSTEM FOR A VEHICLE

(75) Inventors: Tomoyuki Shinmura; Hiromi Inagaki; Masakatsu Hori; Tatsuhiro Tomari; Shinji Okuma; Akihiro Iwazaki; Takashi Kuribayashi; Kazuhiro Wada, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/656,386

(22) Filed: Sep. 6, 2000

(30) Foreign Application Priority Data

Sep. 7, 1999 (JP) ............................................. 11-253033

(51) Int. Cl.[7] ............................. G06F 15/20; B62D 6/00
(52) U.S. Cl. ..................................... 701/48; 180/233
(58) Field of Search ..................... 701/48, 69; 180/233, 180/248

(56) References Cited

U.S. PATENT DOCUMENTS

| | | | |
|---|---|---|---|
| 4,757,870 A | * | 7/1988 | Torii et al. .................. 180/233 |
| 5,032,997 A | * | 7/1991 | Kawagoe ................ 364/424.05 |
| 5,272,635 A | * | 12/1993 | Nakayama .............. 364/426.02 |
| 5,528,497 A | * | 6/1996 | Yamamoto et al. .... 364/424.05 |
| 5,754,970 A | * | 5/1998 | Takasaki et al. .............. 701/87 |
| 6,154,696 A | * | 11/2000 | Nishi et al. .................... 701/41 |
| 6,226,581 B1 | * | 5/2001 | Reimann et al. .............. 701/48 |

FOREIGN PATENT DOCUMENTS

JP            11129927            5/1999

* cited by examiner

*Primary Examiner*—Michael J. Zanelli
*Assistant Examiner*—Eric M Gibson
(74) *Attorney, Agent, or Firm*—Carrier, Blackman & Associates, P.C.; Joseph P. Carrier; William D. Blackman

(57) ABSTRACT

A co-operative control system for a vehicle including a force distribution device for distributing the driving force or braking force between the right and left wheels or between the front and rear wheels, includes a first control means for controlling the operation of the force distribution device, an electric power steering device, having a motor for applying a steering assist torque to a vehicle steering system, and a second control means for calculating a motor control signal for driving the motor. The motor control signal is based on at least the steering torque detected by a steering torque detecting means. The first control means calculates a correction signal for correcting said motor control signal based on the distributed force generated by the force distribution device, the second control means drives the motor based on the corrected motor control signal obtained by correcting the motor control signal with the correction signal and the first control means stops the operation of the force distribution device when the electric power steering device or the second control means malfunctions.

5 Claims, 10 Drawing Sheets

CO-OPERATIVE CONTROL SYSTEM FOR A VEHICLE

CROSS-REFERENCE TO RELATED APPLICATIONS

The present application claims priority under 35 U.S.C. 119 of Japanese laid-open patent application serial no. 11-253033, filed Sep. 9, 1999, the disclosure of which is incorporated herein by reference.

BACKGROUND OF THE INVENTION

1. Field of the Invention

The present invention relates to co-operative control systems for vehicles comprising a combination of a force distribution device, which distributes the driving force or braking force between the right and left wheels or between the front and rear wheels, and an electric power steering device that applies a steering assist torque to a steering system.

2. Description of the Relevant Art

There is a known technique for enhancing turning performance of a vehicle, where the ratio by which the engine driving force is distributed between the right and left driven wheels is made variable, and the driving force distributed to the outer turning wheel is increased while the driving force distributed to the inner turning wheel is decreased so as to generate a yaw moment in the turning direction. In a vehicle having such a driving force distribution device, there is a disadvantage in that when the driving forces distributed to the right and left driven wheels are varied, an undesirable steering force is produced in the right and left driven wheels that also serve as steered wheels (the torque steer phenomenon). Therefore, the present assignee has already made a proposal in which the torque steer phenomenon is lessened by utilizing an electric power steering device, which is provided in a vehicle, and generating a steering assist torque in the electric power steering device so as to counteract the above-mentioned undesirable steering force (ref. Japanese Patent Application No. 9-302155).

In a vehicle carrying out the above-mentioned co-operative control, when the electric power steering device malfunctions and a steering assist torque cannot be generated, the torque steer phenomenon caused by the operation of the driving force distribution device cannot be counteracted and there is a possibility that the driver might experience a disagreeable sensation.

SUMMARY OF THE INVENTION

The present invention has been carried out in view of the above-mentioned circumstances, and it is an objective of the present invention to prevent a disagreeable sensation caused by the aforementioned torque steer phenomenon from being experienced by the driver in the event that the electric power steering device or the control means therefor malfunctions in a vehicle co-operative control system for reducing the torque steer phenomenon by co-operatively controlling the force distribution device and the electric power steering device.

In order to achieve the above-mentioned objective, in accordance with a first aspect of the invention, a co-operative control system for a vehicle is proposed, the system includes a force distribution device for distributing the driving force or braking force between the right and left wheels or between the front and rear wheels. In the practice of the invention, a first control means is provided for controlling the operation of the force distribution device. Also in the practice of the invention, the control system also affects an electric power steering device, having a motor for applying a steering assist torque to the vehicle steering system, and a second control means is provided for calculating a motor control signal for driving the motor. The motor control signal is based on at least the steering torque detected by a steering torque detecting means. The first control means can calculate a correction signal for correcting said motor control signal based on the distributed force generated by the force distribution device. The second control means drives the motor based on the corrected motor control signal obtained by correcting the motor control signal with the correction signal. The first control means stops the operation of the force distribution device when the electric power steering device or the second control means malfunctions.

In accordance with the above-mentioned arrangement, when the electric power steering device or the second control means malfunctions and, as a result, the torque steer phenomenon accompanying the operation of the force distribution device cannot be lessened, the first control means stops the operation of the force distribution device, so preventing the aforementioned torque steer phenomenon from occurring. It is thus possible to prevent the driver from experiencing a disagreeable sensation.

In accordance with a first refinement of the basic invention, a co-operative control system for a vehicle is proposed wherein when the malfunction occurs during the operation of the force distribution device, the first control means gradually decreases the absolute value of the difference between the distributed forces of the force distribution device to the right and left wheels towards zero.

In accordance with the above-mentioned arrangement, when the aforementioned malfunction occurs during the operation of the force distribution device, since the absolute value of the difference between the distributed forces of the force distribution device to the right and left wheels gradually decreases towards zero, a rapid change in the steering reaction, which could be experienced by the driver from the steering wheel can be prevented.

In accordance with a second refinement of the invention, a co-operative control system for a vehicle is proposed wherein when the malfunction occurs while the force distribution device is generating a distributed force which is larger than a reference force, at which the rack shaft force of the electric power steering device becomes zero without a correction by the correction signal, the first control means immediately decreases the distributed force of the force distribution device to a level less than said reference force and then gradually decreases the absolute value of the difference between the distribution forces to the right and left wheels of the distribution device towards zero.

If the aforementioned malfunction occurs when the force distribution system generates a distributed force which is larger than the reference distributed force, torque steer is caused which turns the vehicle sharply towards the inside in the turning direction, but in accordance with the invention, since the distributed force is immediately decreased to a level smaller than the aforementioned reference distributed force when a malfunction occurs, it is possible to prevent the occurrence of the torque steer phenomenon which turns the vehicle sharply towards the inside in the turning direction. Moreover, since the absolute value of the difference between the distributed forces of the distribution device to the right and left wheels is subsequently decreased gradually towards zero, the steering reaction is prevented from changing rapidly.

BRIEF DESCRIPTION OF THE DRAWINGS

The practical features of the present invention are described below by reference to an embodiment of the present invention shown in the attached drawings.

FIGS. 1 to 10 illustrate an embodiment of the present invention.

FIG. 1 is a simplified schematic diagram showing the overall structure of the driving force distribution device.

FIG. 2 is a block diagram showing the configuration of the circuit of the first electronic control unit.

FIG. 3 is a schematic diagram showing the action of the driving force distribution device when the vehicle is turning right at a medium to low speed.

FIG. 4 is a schematic diagram showing the action of the driving force distribution device when the vehicle is turning left at a medium to low speed.

FIG. 5 is a sketch showing the structure of the electric power steering device.

FIG. 6 is a block diagram showing the configuration of the circuit of the second electronic control unit.

FIG. 7 is a map or a graph for looking up the amount of current correction or the offset current from the distributed torque.

FIG. 9 is a graph showing the change in steering force accompanying a malfunction of the electric power steering device.

FIG. 10 is a graph showing the change in the rack shaft force accompanying the operation of the driving force distribution device.

DETAILED DESCRIPTION OF A PREFERRED EMBODIMENT

Figure 1:
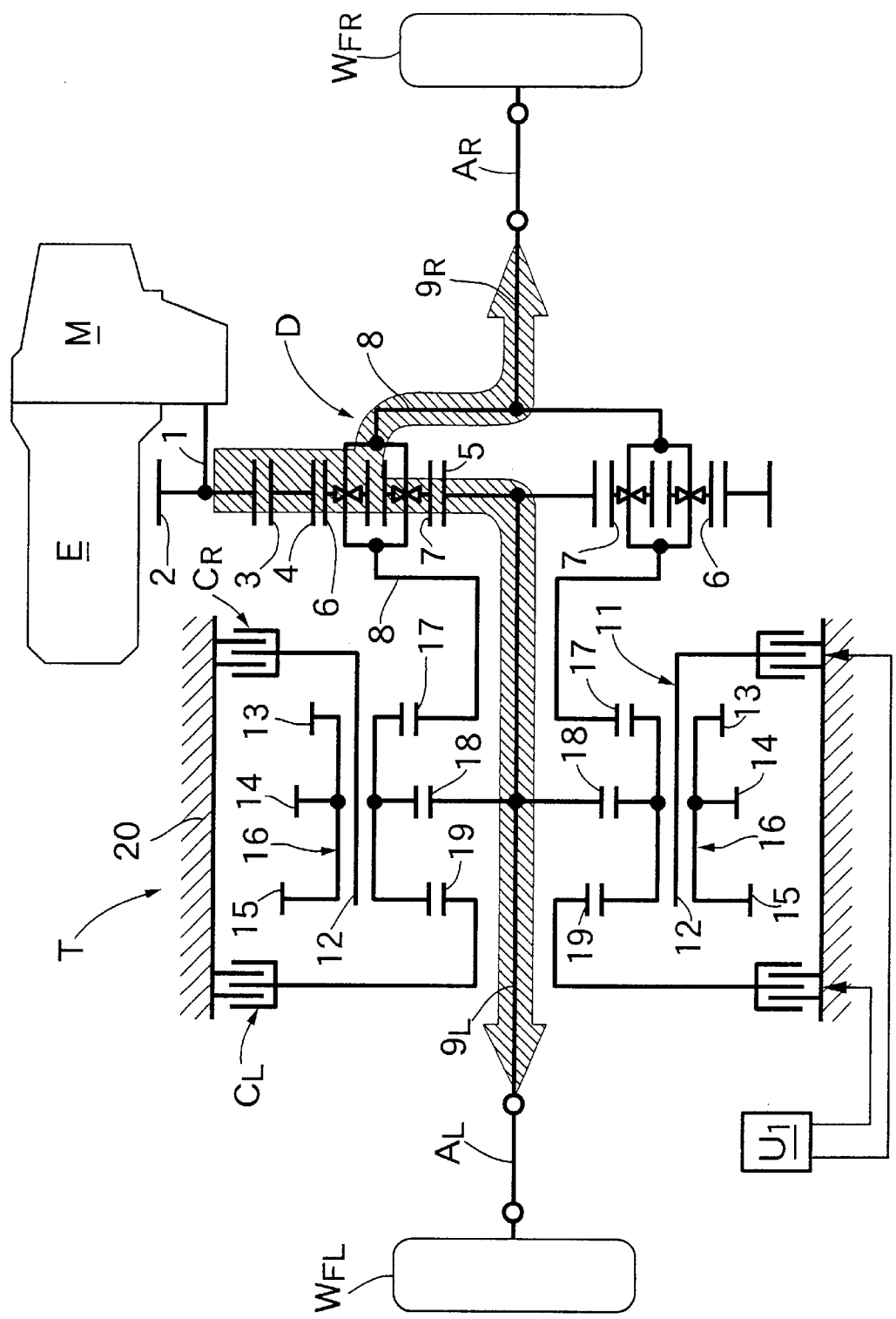

As shown in FIG. 1, a transmission M is connected to the right end of an engine E which is laterally mounted in the front part of the vehicle body of a front-engine front-wheel drive vehicle, and a driving force distribution device T is placed to the rear of engine E and transmission M. A front right wheel $W_{FR}$ and a front left wheel $W_{FL}$ are connected to a right drive shaft $A_R$ and a left drive shaft $A_L$, respectively, which extend laterally from the right end and the left end of the driving force distribution device T.

The driving force distribution device T comprises a differential D to which the driving force is transmitted from an outer toothed gear 3 meshing with an input gear Z provided on an input shaft 1 extending from the transmission M. The differential D employs a double pinion type planetary gear mechanism and comprises a ring gear 4 which is integrally formed with the above-mentioned outer toothed gear 3, a sun gear 5 which is provided coaxially inside the ring gear 4, and a planetary carrier 8 which supports an outer planetary gear 6 meshing with the above-mentioned ring gear 4 and an inner planetary gear 7 meshing with the above-mentioned sun gear 5, in a state in which they are meshed with each other. In the differential D the ring gear 4 functions as an input element while the sun gear 5, which functions as one of the output elements, is connected to the front left wheel $W_{FL}$ via a left output shaft $9_L$. The planetary carrier 8, which functions as the other of the output elements, is connected to the front right wheel $W_{FR}$ via a right output shaft $9_R$.

A carrier member 11 which is supported on the outer circumference of the left output shaft $9_L$ in a rotatable manner comprises four pinion shafts 12 provided in the circumferential direction at 90° intervals, and each pinion shaft 12 supports in a rotatable manner a triad pinion member 16 in which a first pinion 13, a second pinion 14 and a third pinion 15 are integrally formed.

A first sun gear 17 meshing with the above-mentioned first pinion 13, which is supported in rotatable manner on the outer circumference of the left output shaft $9_L$, is linked to the planetary carrier 8 of the differential D. A second sun gear 18 which is fixed on the outer circumference of the left output shaft $9_L$ meshes with the above-mentioned second pinion 14. Furthermore, a third sun gear 19 which is supported in a rotatable manner on the outer circumference of the left output shaft $9_L$ meshes with the above-mentioned third pinion 15.

The numbers of teeth of the first pinion 13, the second pinion 14, the third pinion 15, the first sun gear 17, the second sun gear 18 and the third sun gear 19 in the embodiment are as follows.

Number of teeth of the first pinion 13 $Z_2=17$
Number of teeth of the second pinion 14 $Z_4=17$
Number of teeth of the third pinion 15 $Z_6=34$
Number of teeth of the first sun gear 17 $Z_1=32$
Number of teeth of the second sun gear 18 $Z_3=28$
Number of teeth of the third sun gear 19 $Z_5=32$ The third sun gear 19 can be connected to a casing 20 via a left hydraulic clutch $C_L$, and the rotational rate of a carrier member 11 is increased by engagement of the left hydraulic clutch $C_L$. The carrier member 11 can be connected to the casing 20 via a right hydraulic clutch $C_R$, and the rotational rate of the carrier member 11 is reduced by engagement of the right hydraulic clutch $C_R$. The above-mentioned right hydraulic clutch $C_R$ and left hydraulic clutch $C_L$ are controlled by a first electronic control unit $U_1$ containing a microcomputer.

Figure 2:
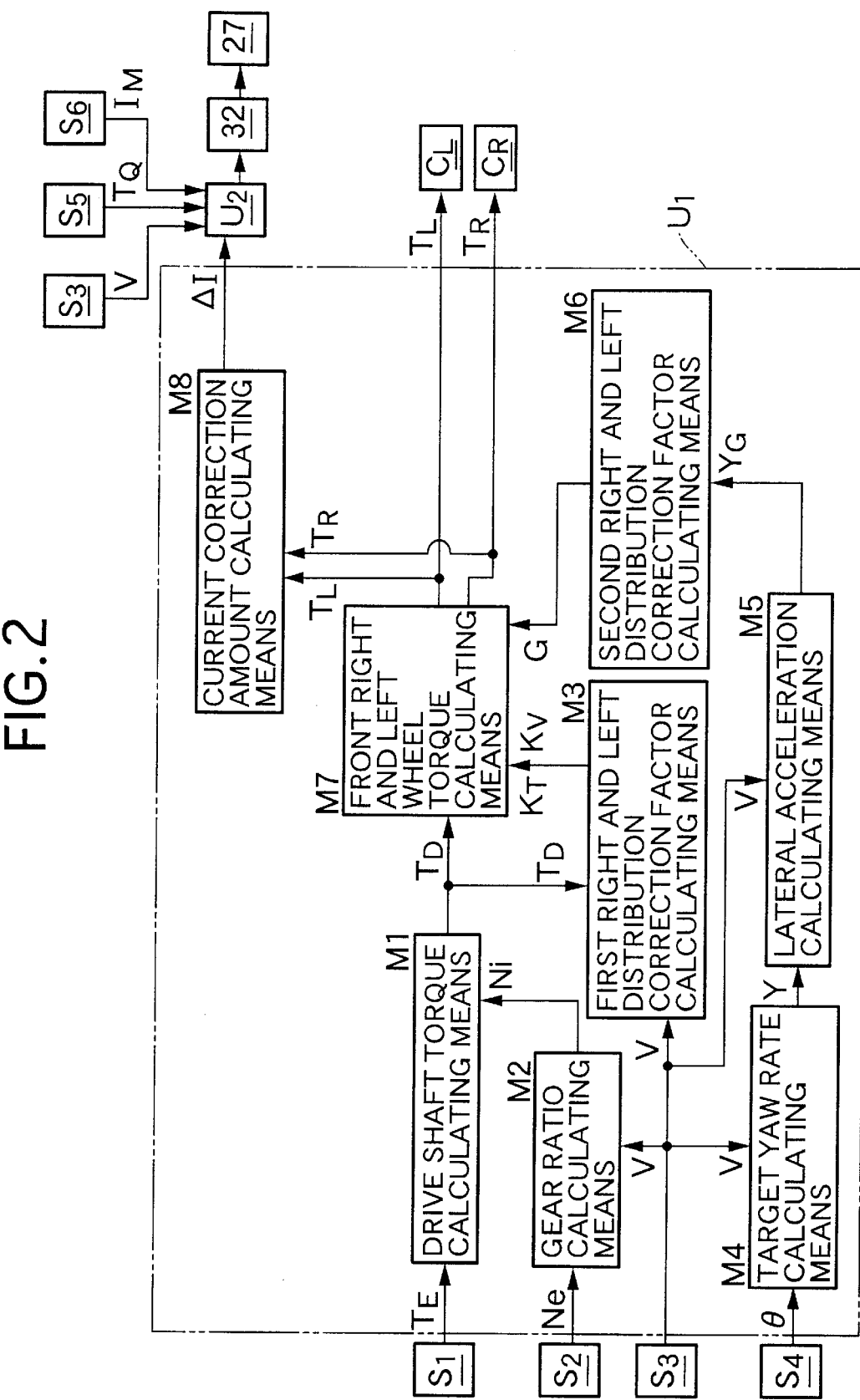

As shown in FIG. 2, signals from an engine torque detecting means $S_1$ for detecting the engine torque $T_E$, an engine rotational rate detecting means $S_2$ for detecting the rotational rate Ne of the engine E, a vehicle speed detecting means $S_3$ for detecting the vehicle speed V and a steering angle detecting means $S_4$ for detecting the steering angle θ are input into the first electronic control unit $U_1$. The first electronic control unit $U_1$ processes the signals from the above-mentioned detecting means $S_1$ to $S_4$ based on a predetermined program, thus controlling the above-mentioned left hydraulic clutch $C_L$ and right hydraulic clutch $C_R$.

The first electronic control unit $U_1$ comprises a drive shaft torque calculating means M1, a gear ratio calculating means M2, a first right and left distribution correction factor calculating means M3, a target yaw rate calculating means M4, a lateral acceleration calculating means M5, a second right and left distribution correction factor calculating means M6, a front right and left wheel torque calculating means M7 and a current correction amount calculating means M8.

The drive shaft torque calculating means M1 calculates the drive shaft torque $T_D$ (that is to say, the total torque transmitted to the front right and left wheels $W_{FR}$, $W_{FR}$) by multiplying the engine torque $T_E$ by the gear ratio Ni produced by the gear ratio calculating means M2 from the rotational rate Ne of the engine and the vehicle speed V. The engine torque $T_E$ can be obtained from the intake pressure (or opening of the accelerator) and the rotational rate Ne of the engine, and the drive shaft torque $T_D$ can also be obtained by a means other than that mentioned above such as a torque detecting means provided on the power transmission system or the longitudinal acceleration of the vehicle. Furthermore, the vehicle speed V may be determined by a means other than the wheel speed such as an optical means using a spatial filter, or it may be determined using a Doppler radar.

The first right and left distribution correction factor calculating means M3 carries out a map look-up for a first right and left distribution correction factor $K_T$ based on the drive shaft torque $T_D$ and a second right and left distribution correction factor $K_V$ based on the vehicle speed V. The target yaw rate calculating means M4 carries out map look-up for the steering angle component $Y_1$ of the target yaw rate Y based on the steering angle θ and the vehicle speed component $Y_2$ of the target yaw rate Y based on the vehicle speed V, and calculates the target yaw rate Y by multiplying the steering angle component $Y_1$ by the vehicle speed component $Y_2$. The lateral acceleration calculating means M5 calculates the lateral acceleration $Y_G$ by multiplying the aforementioned target yaw rate Y by the vehicle speed V, and the second right and left distribution correction factor calculating means M6 carries out a map look-up for the right and left distribution correction factor G based on the above-mentioned lateral acceleration $Y_G$.

Finally, the front right and left wheel torque calculating means M7 calculates a distributed torque $T_L$ that is to be distributed to the front left wheel $W_{FL}$ and a distributed torque $T_R$ that is to be distributed to the front right wheel $W_{FR}$ based on the equations below.

$$T_L=(T_D/2)\times(1+K_W\times K_T\times K_V\times G) \quad (1)$$

$$T_R=(T_D/2)\times(1-K_W\times K_T\times K_V\times G) \quad (2)$$

Here, $K_V$ and $K_T$ denote the right and left distribution correction factors obtained by the first right and left distribution correction factor calculating means M3, G denotes the right and left distribution correction factor obtained by the right and left distribution correction factor calculating means M6, and $K_w$ is a constant.

The term $(1\pm K_W\times K_T 33\ K_V\times G)$ on the right hand side of equation (1) and equation (2) determines the torque distribution ratio between the front right and left wheels $W_{FR}$, $W_{FL}$, and when the torque distribution to one of the front right and left wheels $W_{FR}$, $W_{FL}$ increases by a predetermined amount, the torque distribution to the other of the front right and left wheels $W_{FR}$, $W_{FL}$ decreases by the above-mentioned predetermined amount.

When the distributed torques $T_R$, $T_L$ that are to be distributed to the front right and left wheels $W_{FR}$, $W_{FL}$ are determined as above-mentioned, the right hydraulic clutch $C_R$ and left hydraulic clutch $C_L$ are controlled so that the above-mentioned distributed torques $T_R$, $T_L$ are transmitted to the front right and left wheels $W_{FR}$, $W_{FL}$.

The distributed torques $T_R$, $T_L$ that are to be distributed to the right and left front wheels $W_{FR}$, $W_{FL}$ and which are calculated by the front right and left wheel torque calculating means M7 are input into the current correction amount calculating means M8. The current correction amount calculating means M8 inputs the distributed torques $T_R$, $T_L$ to the map shown in FIG. 7 and looks up the amount of current correction Δl for the motor 27 of the electric power steering device S described below. The amount of current correction Δl corresponds to current level necessary for the electric power steering device S to generate a steering torque that can counteract the torque-steer phenomenon caused by the distributed torques $T_R$, $T_L$ generated by the driving force distribution device T.

Figure 7:
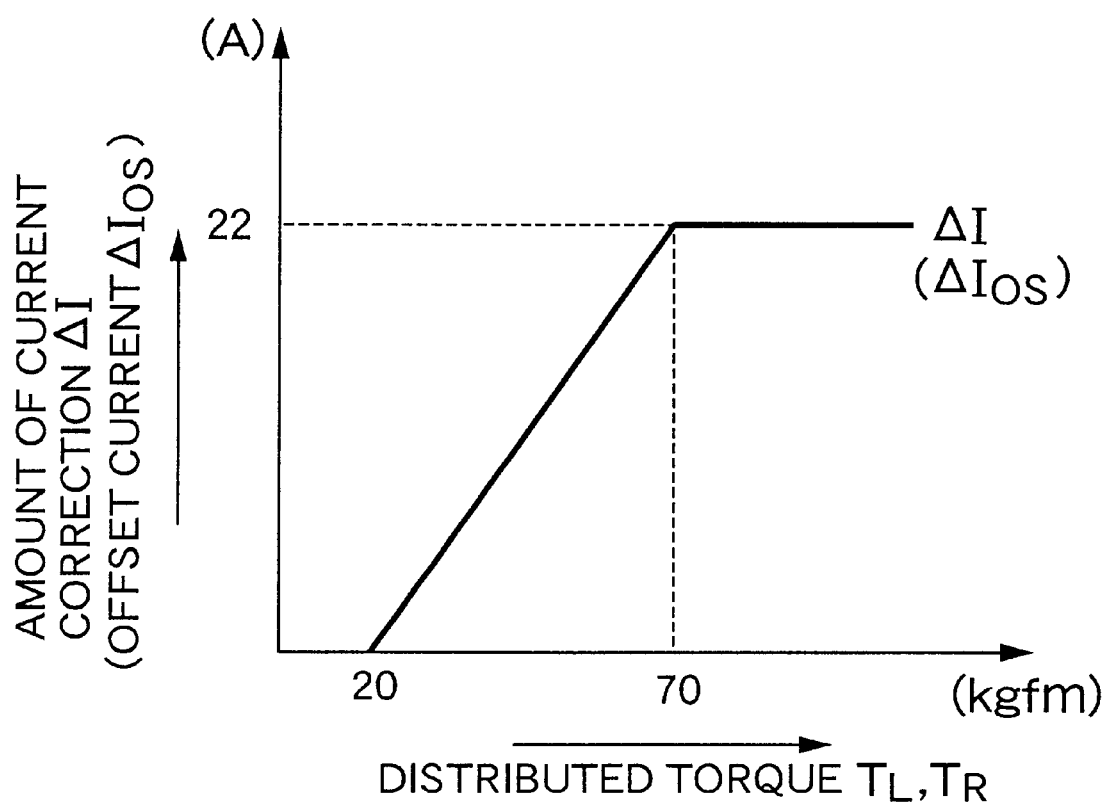

As is clear from FIG. 7, the amount of current correction Δl increases linearly from 0 A to 22 A while the distributed torques $T_R$, $T_L$ increase from 20 kgfm to 70 kgfm, and when the distributed torques $T_R$, $T_L$ exceed 70 kgfm the amount of current correction Δl is maintained at an upper limit value of 22 A. Although the maximum value for the current that is supplied to the motor 27 of the electric power steering device S for steering assist is 85 A, the upper limit value of 22A for the amount of current correction Δl is set so as to be smaller than the above-mentioned maximum value for the current.

In accordance with a command from the first electronic control unit $U_1$, both the right hydraulic clutch $C_R$ and the left hydraulic clutch $C_L$ are in a disengaged state while the vehicle is travelling straight ahead. Thus, the carrier member 11 and the third sun gear 19 are not restrained, and the left drive shaft $9_L$, the right drive shaft $9_R$, the planetary carrier 8 of the differential D and the carrier member 11 all rotate in unison. At this time the torque of the engine E is transmitted equally from the differential D to the front right and left wheels $W_{FR}$, $W_{FL}$ as shown by the hatched arrows in FIG. 1.

Figure 3:
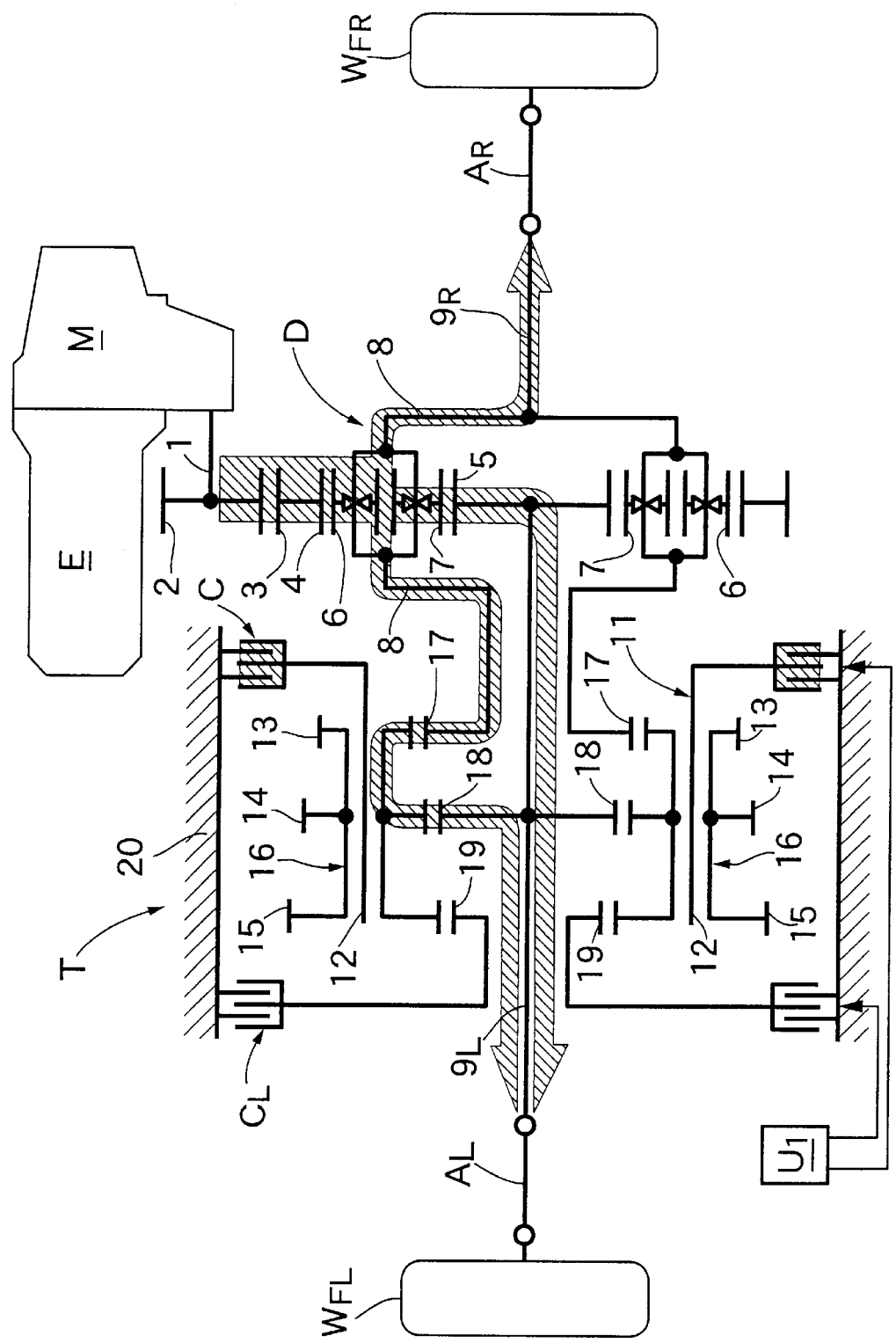

When the vehicle is turning right at a medium to low speed, as shown in FIG. 3 the right hydraulic clutch $C_R$ is engaged in accordance with a command from the first electronic control unit $U_1$ so as to stop the carrier member 11 by connecting it to the casing 20. At this time, since the left output shaft $9_L$ which is integrated with the front left wheel $W_{FL}$ and the right output shaft $9_R$ which is integrated with the front right wheel $W_{FR}$ (that is to say, the planetary carrier 8 of the differential D) are linked via the second sun gear 18, the second pinion 14, the first pinion 13 and the first sun gear 17, the rotational rate $N_L$ of the front left wheel $W_{FL}$ is increased relative to the rotational rate $N_R$ of the front right wheel $W_{FR}$ according to the relationship shown in the equation below.

$$N_L/N_R = (Z_4/Z_3)\times(Z_1/Z_2) \quad (3)$$

$$= 1.143$$

When the rotational rate $N_L$ of the front left wheel $W_{FL}$ is increased relative to the rotational rate $N_R$ of the front right wheel $W_{FR}$ as above-mentioned, a proportion of the torque of the front right wheel $W_{FR}$ which is the inner turning wheel can be transmitted to the front left wheel $W_{FL}$ which is the outer turning wheel as shown by the hatched arrow in FIG. 3.

Instead of stopping the carrier member 11 by means of the right hydraulic clutch $C_R$, if the rotational rate of the carrier member 11 is reduced by appropriately adjusting the engagement force of the right hydraulic clutch $C_R$, the rotational rate $N_L$ of the front left wheel $W_{FL}$ can be increased relative to the rotational rate $N_R$ of the front right wheel $W_{FR}$ according to the deceleration, and the required level of torque can be transferred from the front right wheel $W_{FR}$ which is the inner turning wheel to the front left wheel $W_{FL}$ which is the outer turning wheel.

Figure 4:
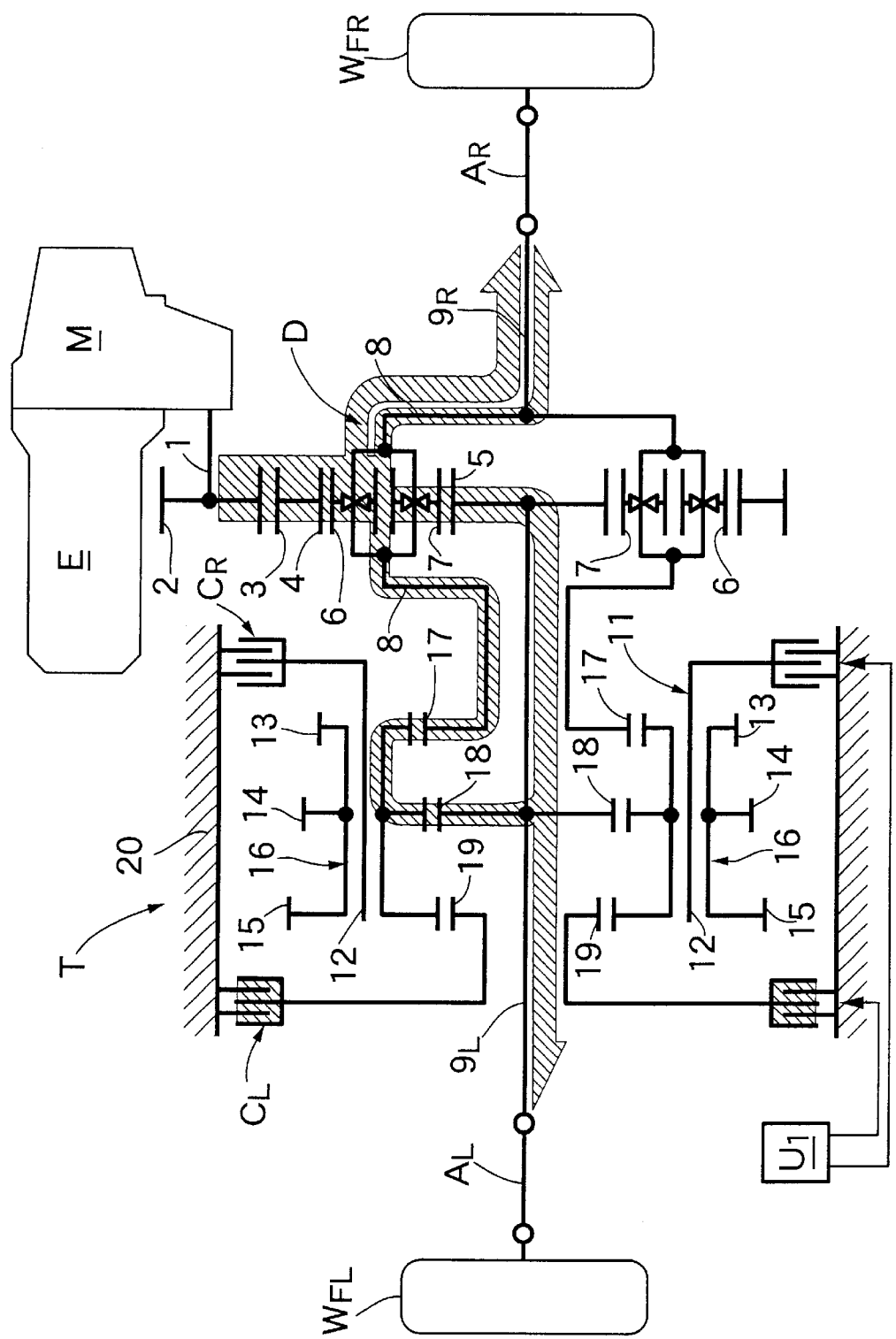

On the other hand, when the vehicle is turning left at a medium to low speed, as shown in FIG. 4, the left hydraulic clutch $C_L$ Is engaged in accordance with a command from the first electronic control unit $U_1$ and the third pinion 15 is connected to the casing 20 via the third sun gear 19. As a result, the rotational rate of the carrier member 11 increases relative to the rotational rate of the left output shaft $9_L$, and the rotational rate $N_R$ of the front right wheel $W_{FR}$ is increased relative to the rotational rate $N_L$ of the front left wheel $W_{FL}$ in accordance with the relationship shown in the equation below.

$$N_R/N_L = \{1 - (Z_5/Z_6) \times (Z_2/Z_1)\} \div \{1 - (Z_5/Z_6) \times (Z_4/Z_3)\} \quad (4)$$

$$= 1.167$$

As mentioned above, when the rotational rate $N_R$ of the front right wheel $W_{FR}$ increases relative to the rotational rate $N_L$ of the front left wheel $W_{FL}$, a proportion of the torque of the front left wheel $W_{FL}$, which is the inner turning wheel, can be transmitted to the front right wheel $W_{FR}$, which is the outer turning wheel, as shown by the hatched arrow in FIG. 4. In this case also, if the rotational rate of the carrier member 11 is increased by appropriately adjusting the engagement force of the left hydraulic clutch $C_L$, according to the acceleration, the rotational rate $N_R$ of the front right wheel $W_{FR}$ can be increased relative to the rotational rate $N_L$ of the front left wheel $W_{FL}$, and the required level of torque can be transferred from the front left wheel $W_{FL}$, which is the inner turning wheel, to the front right wheel $W_{FR}$, which is the outer turning wheel. It is thus possible to enhance the turning performance by transmitting a larger torque to the outer turning wheel than to the inner turning wheel at times when the vehicle is travelling at a medium to low speed. In addition, when the vehicle is travelling at a high speed it is possible to enhance the stability of travel by lessening the torque transmitted to the outer turning wheel in comparison with the above-mentioned case of a medium to low speed or alternatively by transferring torque from the outer turning wheel to the inner turning wheel. This can be achieved in the first right and left distribution correction factor calculating means M3 of the first electronic control unit $U_1$ by setting the map of the second right and left distribution correction factor $K_V$ relative to vehicle speed V.

As is clear from a comparison of equation (3) with equation (4), since the numbers of teeth of the first pinion 13, the second pinion 14, the third pinion 15, the first sun gear 17, the second sun gear 18 and the third sun gear 19 are set as above-mentioned, the ratio (about 1.143) of the rotational speed of the front left wheel $W_{FL}$ to the rotational speed of the front right wheel $W_{FR}$ and the ratio (about 1.167) of the rotational speed of the front right wheel $W_{FR}$ to the rotational at speed of the front left wheel $W_{FL}$ can be made almost equal to each other.

When changes are made in the driving forces which are distributed from the engine E to the front right and left wheels $W_{FR}$, $W_{FL}$ via the driving force distribution device T, undesirable steering forces are produced in the front right and left wheels $W_{FR}$, $W_{FL}$, which are steered wheels, due to the so-called torque steer phenomenon. In a vehicle containing an electric power steering device S if the torque steer phenomenon is caused due to the operation of the driving force distribution device T then by operating the electric power steering device S so as to cancel the steering force due to the torque steer phenomenon and generate a steering assist torque in the opposite direction the above-mentioned torque steer phenomenon can be lessened.

Figure 5:
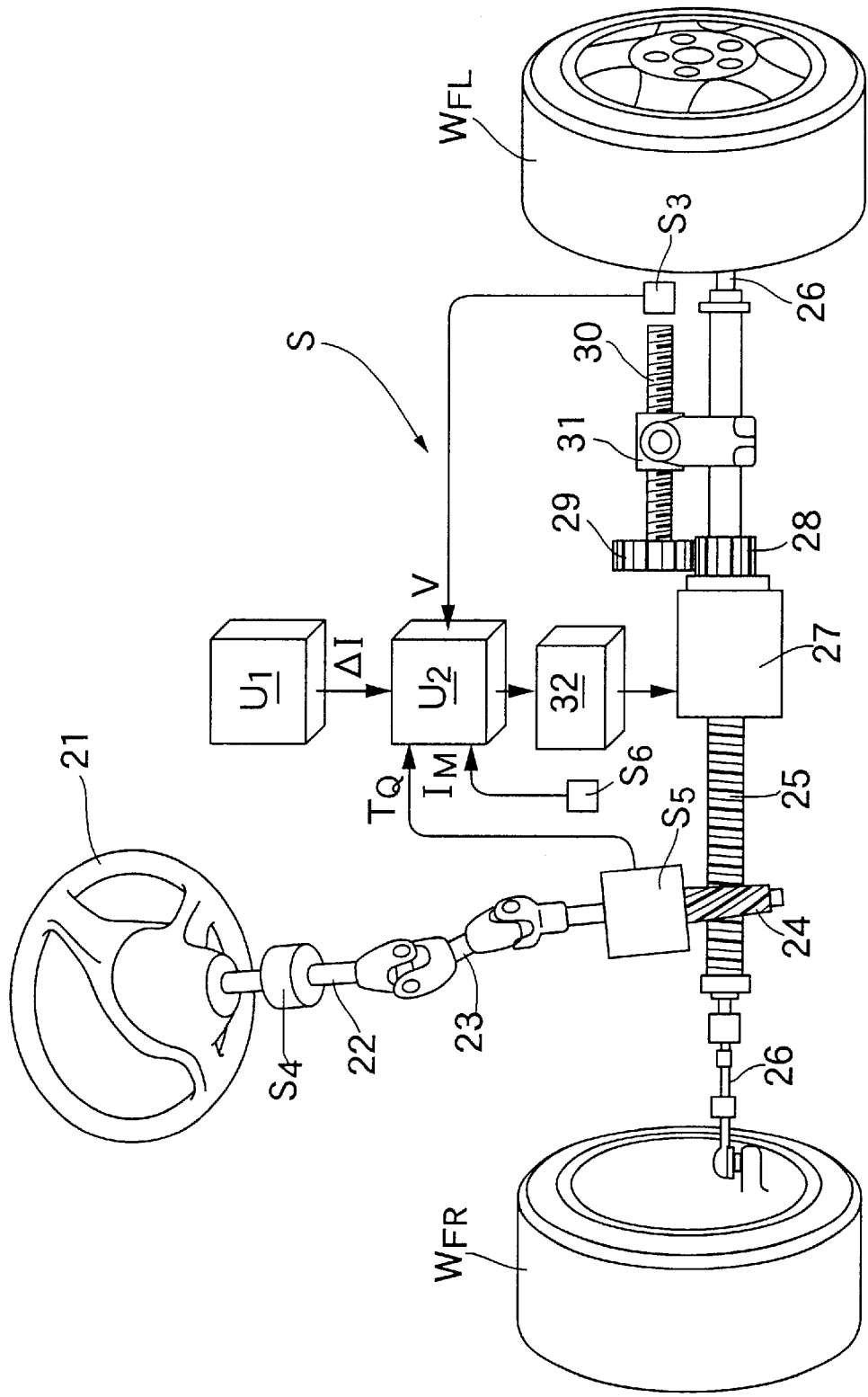

Next, an explanation of a vehicle steering system is given based on FIG. 5.

A steering torque which is input into a steering wheel 21 by a driver is transmitted to a rack 25 via a steering shaft 22, a connecting shaft 23 and a pinion 24, and the reciprocating motion of the rack 25 is further transmitted to the front right and left wheels $W_{FR}$, $W_{FL}$ via right and left tie rods 26, 26 so as to steer the front wheels $W_{FR}$, $W_{FL}$. An electric power steering device S provided in the steering system comprises a drive gear 28 provided on an output shaft of a motor 27, a driven gear 29 meshing with the drive gear 28, a screw shaft 30 which is integral with the driven gear 29, and a nut 31 which meshes with the screw shaft 30 and is also connected to the above-mentioned rack 25.

A second electronic control unit $U_2$ does not control the operation of the electric power steering device S by itself, but it co-operatively controls the operation of the electric power steering device S in conjunction with the operation of the driving force distribution device T.

Figure 6:
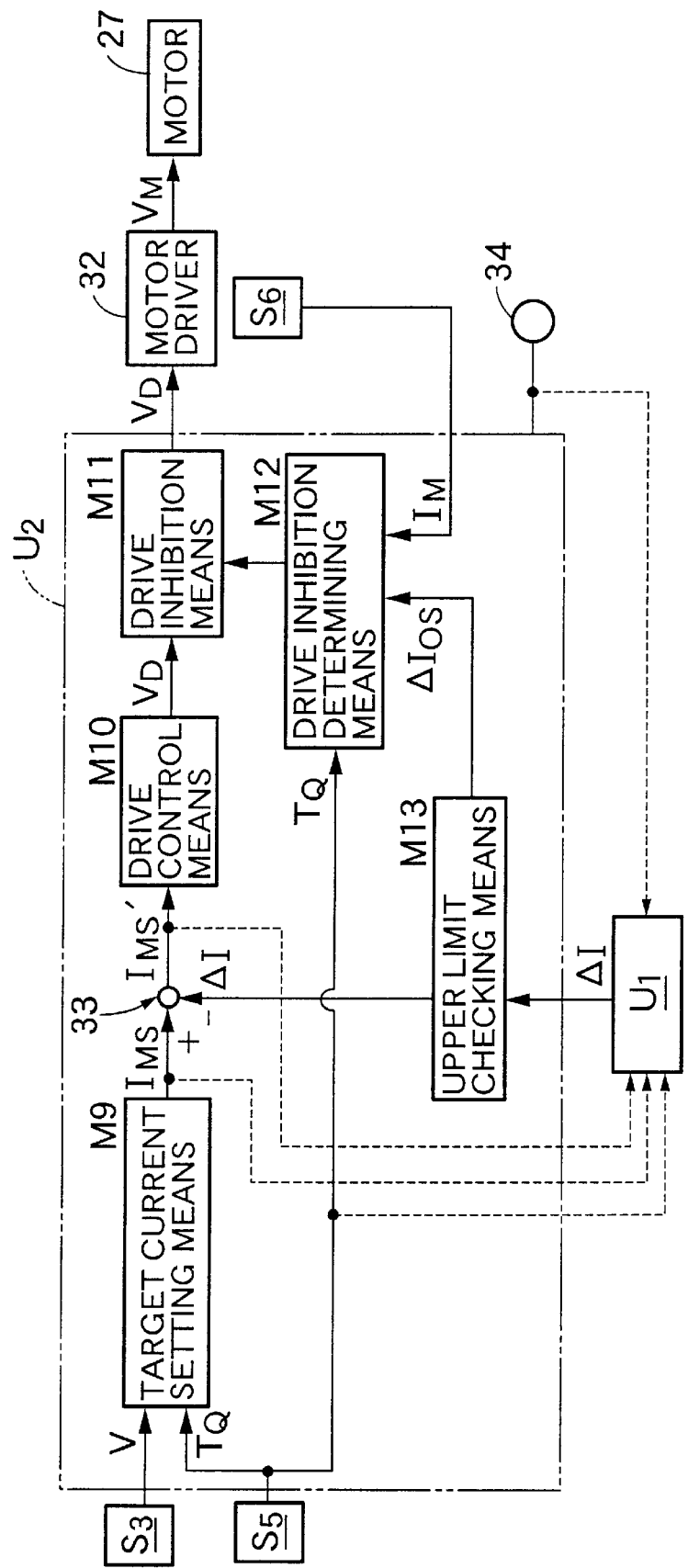

As shown in FIG. 6, the second electronic control unit $U_2$ comprises a target current setting means M9, a drive control means M10, a drive inhibition means M11, a drive inhibition determining means M12, an upper limit checking means M13 and a subtraction means 33.

The upper limit checking means M13 checks that the amount of current correction $\Delta I$ input from the first electronic control unit $U_1$ is definitely not higher than 22 A.

The target current setting means M9 carries out a map look up for the target current $I_{MS}$ for driving the motor 27 of the electric power steering device S based on the vehicle speed V which is input from the vehicle speed detecting means $S_3$ and the steering torque $T_0$ which is input from the steering torque detecting means $S_5$. The target current $I_{MS}$ is set so as to increase in response to an increase in the steering torque $T_Q$ and increase in response to a decrease in the vehicle speed V, and these characteristics allow a steering assist torque to be generated according to the travel state of the vehicle.

The target current $I_{MS}$ which is output from the target current setting means M9 and the amount of current correction $\Delta I$ which is output from the upper limit checking means M13 are input into the subtraction means 33, in which the amount of current correction $\Delta I$ is subtracted from the target current $I_{MS}$ so as to give a corrected target current $I_{MS}'$ ($=I_{MS}-\Delta I$). In the present embodiment, since a steering force is applied due to operation of the driving force distribution device T in the same direction as that of the steering operation by the driver, the corrected target current $I_{MS}'$ is calculated by subtracting the amount of current correction $\Delta I$ from the target current $IM_S$.

The drive control means M10 converts the corrected target current $IM_S'$ into a motor drive signal $V_D$ and outputs the motor drive signal $V_D$ to the drive inhibition means M11. When no drive inhibition signal is input from the drive inhibition determining means M12, the drive inhibition means M11 outputs the above-mentioned motor drive signal $V_D$ to the motor driver 32 so as to drive the motor 27 at a motor voltage $V_M$ and thus the electric power steering device S is made to generate a steering assist torque. By controlling the electric power steering device S based on the corrected target current $I_{MS}'$ calculated from the target current $I_{MS}$ and the amount of current correction $\Delta I$ it becomes possible to simultaneously lessen the torque steer phenomenon and assist the steering operation by the driver, which is the primary function of the electric power steering device S.

In the case where an abnormality such as a malfunction of the control system occurs, a drive inhibition signal is input from the drive inhibition determining means M12 into the drive inhibition means M11, the drive inhibition means M11 inhibits the output of the above-mentioned motor drive signal $V_D$ and the operation of the electric power steering device S, and thus the electric power steering device S is prevented from generating a steering assist torque which is not anticipated by the driver. The drive inhibition determining means M12 together with the torque sensing means $S_5$, a current detecting means $S_6$ and the upper limit checking means M13, is a means for determining a malfunction of the electric power steering device S or the second control means $U_2$.

An actual motor current $I_M$ which is detected by the current detecting means $S_6$ and supplied to the motor 27, a steering torque $T_Q$ detected by a steering torque detecting means $S_5$ and an offset current $\Delta I_{OS}$ which is output from the upper limit checking means M13 are input into the drive inhibition determining means M12. In the present embodiment, the offset current $\Delta I_O S$ is the same as the amount of current correction $\Delta I$ ($\Delta I = \Delta I_{OS}$). The drive inhibition determining means M12 determines whether or not the drive of the electric power steering device S is to be inhibited by inputting the actual motor current $I_M$ and the steering torque $T_Q$ to a map which has been corrected on the basis of the offset current $\Delta I_{OS}$.

Figure 8A:
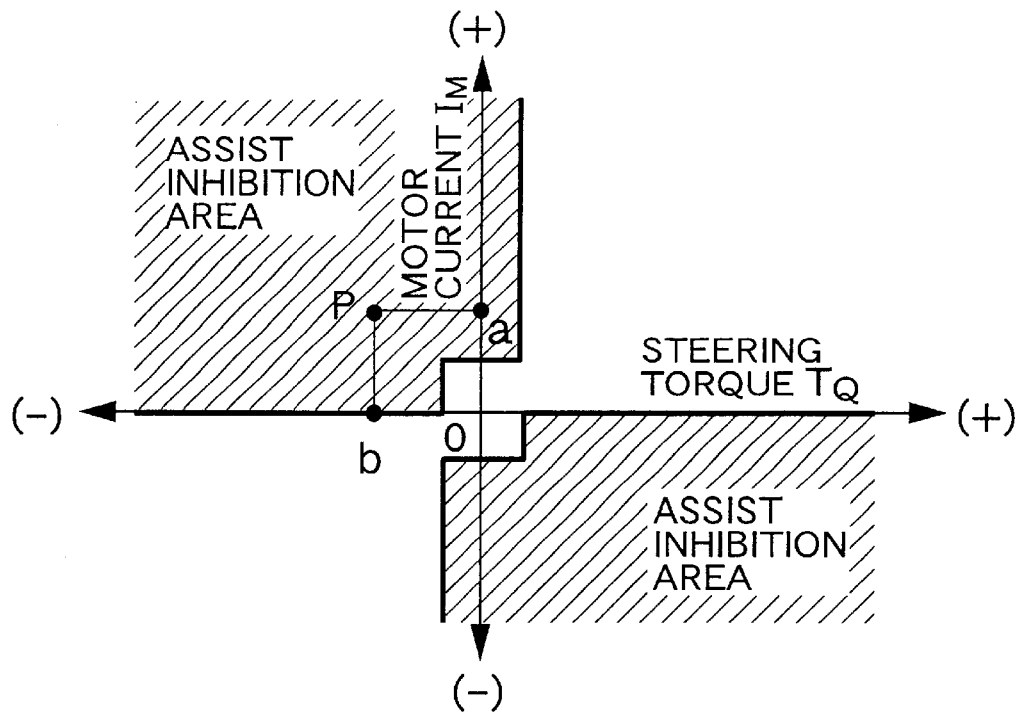
FIGS. 8A and 8B are maps or graphs for looking up the area in which operation of the electric power steering device is inhibited.

FIG. 8A is a map of the art for carrying out the above-mentioned determination, and this map was originally prepared for a vehicle not containing a driving force distribution device T, that is to say, a vehicle in which co-operative control of an electric power steering device S and a driving force distribution device T was not carried out. In the figure the abscissa denotes the steering torque $T_Q$ detected by the steering torque detecting means $S_5$ and the ordinate denotes the actual motor current $I_M$ detected by the current detecting means $S_6$. The region on the right-hand side of the origin on the abscissa in which the steering torque $T_Q$ is positive (+) corresponds to a case in which a steering torque in the direction for turning right is input into the steering wheel 21, and the region on the left-hand side of the origin on the abscissa in which the steering torque $T_Q$ is negative (−) corresponds to a case in which a steering torque in the direction for turning left is input into the steering wheel 21. The region above the origin on the ordinate in which the actual motor current $I_M$ is positive (+) corresponds to a case in which the motor 27 outputs a torque in the direction for turning right, and the region below the origin on the ordinate in which the actual motor current $I_M$ is negative (−) corresponds to a case in which the motor 27 outputs a torque in the direction for turning left. When the steering torque $T_Q$ and the actual motor current $I_M$ are in the hatched assist inhibition regions, the drive inhibition determining means M12 outputs a command to inhibit the drive of the motor 27 to the drive inhibition means M11.

For example, when the motor 27 is driven in the direction for turning right by a large current due to a malfunction of the second electronic control unit $U_2$ despite the driver not carrying out a steering operation, the actual motor current $I_M$ at that time is in position 'a' in the (+) region. Since the motor 27 is driven in the direction for turning right against the drivers will, the driver attempts to drive the vehicle in a straight line by applying a strong steering torque $T_Q$ in the direction for turning left to the steering wheel 21 and, therefore, the steering torque $T_Q$ detected by the steering torque detecting means $S_5$ corresponds to position 'b' in the (−) region. As a result, the actual motor current $I_M$ and the steering torque $T_Q$ have a relationship denoted by the point P in FIG. 8A and enter the hatched assist inhibition region, the drive inhibition determining means M12 outputs a command to inhibit the drive of the motor 27 and thus it is possible to prevent the electric power steering device S from generating an undesirable steering assist torque.

The above-mentioned explanation applies to a vehicle in which co-operative control of the electric power steering device S and the driving force distribution device T is not carried out, but vehicles that carry out co-operative control have the following disadvantages. That is to say, since the actual motor current $I_M$ in a vehicle which carries out co-operative control includes a current component for assisting the steering operation of the driver and a current component for lessening the torque steer phenomenon, if the map in FIG. 8A in which the current component for lessening the torque steer phenomenon is not considered is used as it is, there is a possibility that an erroneous determination might be made and the operation of the electric power steering device S might be inhibited when its operation is necessary or the operation of the electric power steering device S might be permitted when its operation is unnecessary.

For example, in a vehicle which carries out co-operative control, there are cases in which steering assist is permitted even in regions in which the direction of the steering torque $T_Q$ is opposite to the direction of the actual motor current $I_M$ (the second and fourth quadrants in FIG. 8A). This is because a torque steer phenomenon in the same direction as the steering direction is caused by the operation of the driving force distribution device T. Considering a case in which the amount of current correction $\Delta I$ in the opposite direction to the torque steer phenomenon that is required in order to counteract it is larger than the target current $I_{MS}$ of the electric power steering device S, if the map in FIG. 8A is used, as it is, it is impossible to counteract the torque steer phenomenon since the steering assist is inhibited.

Figure 8B:
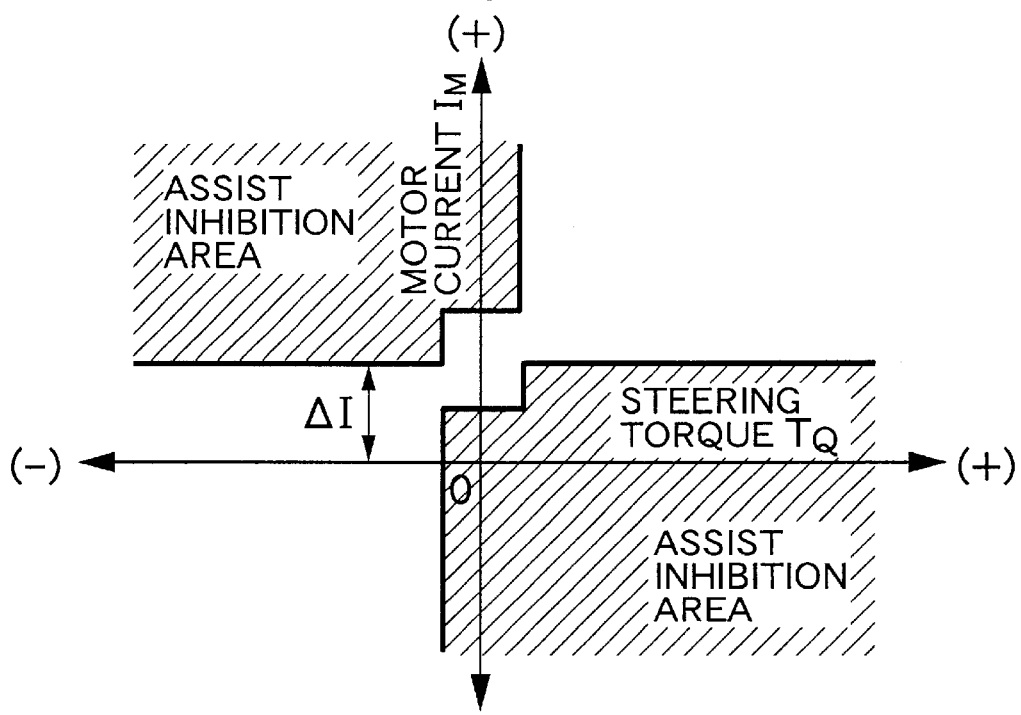

In the present embodiment, in order to avoid the above-mentioned situation, as shown in FIG. 8B, the assist inhibition area may be shifted upwards in the ordinate direction by an amount corresponding to the amount of current correction $\Delta I$ (that is to say, the offset current $\Delta I_{OS}$). By so doing it is possible to cause an amount of steering torque, in the direction opposite to that of the steering direction, corresponding to the amount of current correction $\Delta I$ in the electric power steering device S and thus cancel the torque steer phenomenon accompanying the operation of the driving force distribution device T.

An alarm lamp 34 provided on the second electronic control unit $U_2$ illuminates when a malfunction occurs in the above-mentioned second electronic control unit $U_2$ or the electric power steering device S, and an alarm signal for illuminating the alarm lamp 34 is input into the first electronic control unit $U_1$. Moreover, the steering torque $T_Q$, the target current $I_{MS}$ and the corrected target current $I_{Ms}'$ are input from the second electronic control unit $U_2$ into the first electronic control unit $U_1$ as communication data. In the case where the above-mentioned alarm signal is input or in the case where the occurrence of an abnormality is confirmed from the aforementioned communication data, the first electronic control unit $U_1$ determines that the electric power steering device S or the second electronic control unit $U_2$ has malfunctioned and cannot generate an adequate steering assist torque, and stops operation of the driving force distribution device T.

Figure 9:
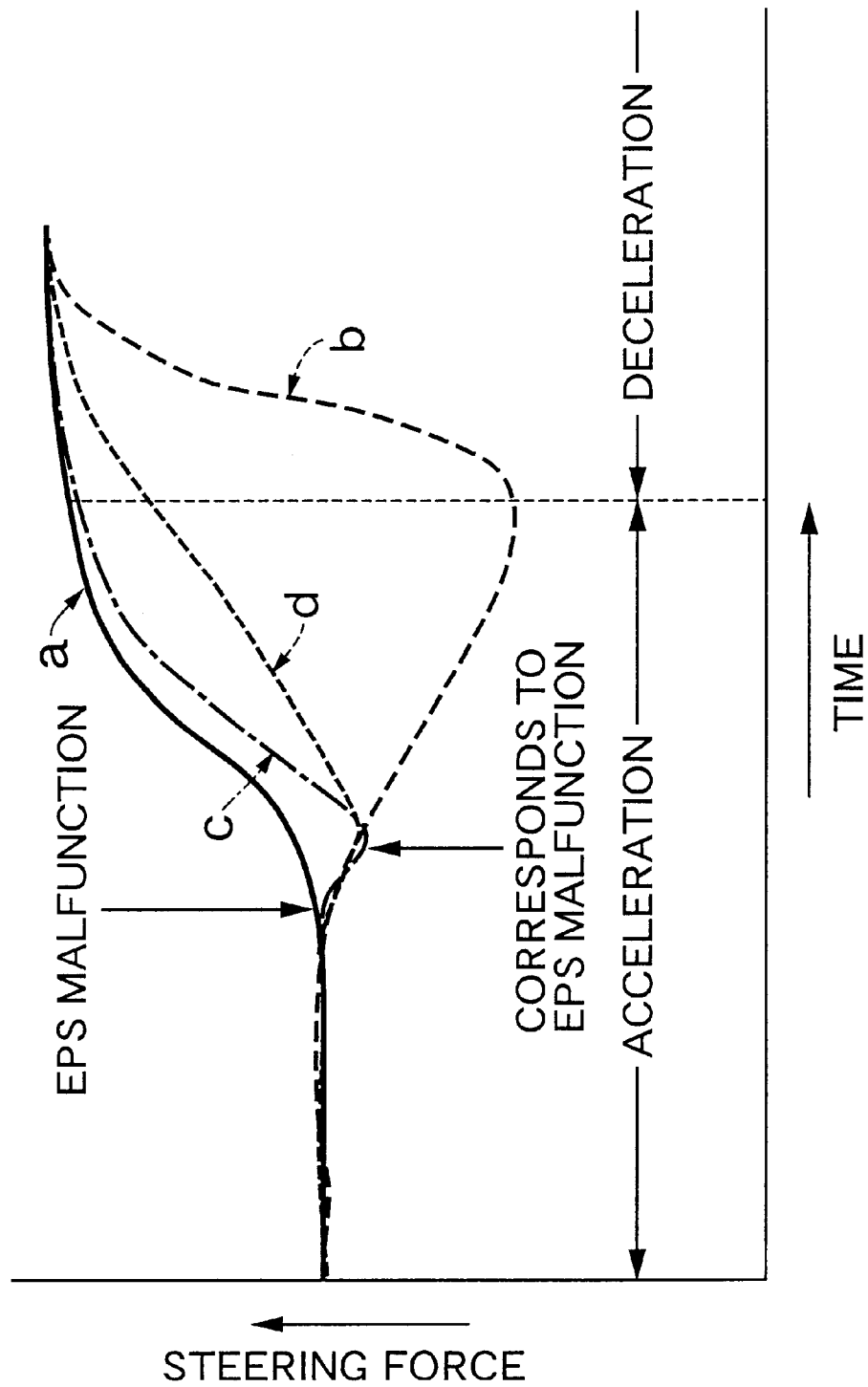

FIG. 9 shows the change in steering force when the electric power steering device S (or the second electronic control unit $U_2$) malfunctions when the vehicle is turning with acceleration. The state of acceleration in the figure refers to the state in which the driving force distribution device T is operating normally and the state of deceleration refers to the state in which the driving force distribution device T is non-operational.

Line a corresponds to vehicles having no driving force distribution device T, and since the electric power steering device S cannot generate an assist force as soon as a malfunction occurs, the steering force increases.

Line b corresponds to vehicles having an electric power steering device S and a driving force distribution device T and carrying out co-operative operation, and the operation of the driving force distribution device T continues even when a malfunction occurs. In this case, the steering force decreases as soon as a malfunction occurs, and when the vehicle moves from a state of acceleration to a state of deceleration, the steering force rapidly increases.

The reason for this is that, since the torque steer phenomenon caused by the operation of the driving force distribution device T functions so as to assist the vehicle to turn, in order to counteract this torque steer phenomenon it is necessary to generate a steering assist torque in the opposite direction to the direction of the steering operation in the electric power steering device S. In general, the amount of the above-mentioned steering assist torque in the opposite direction exceeds the amount of the steering assist torque for assisting the steering operation of the driver which is generated by the electric power steering device S as its primary function, and as a result a steering assist torque is generated by the electric power steering device S in the opposite direction (the direction which increases the steering force) to the direction of the steering operation. Therefore, if the electric power steering device S malfunctions in this state and cannot generate a steering assist torque in the opposite direction to the direction of the aforementioned steering operation, the result is that the steering force decreases. When the vehicle moves from a state of acceleration to a state of deceleration and the driving force distribution device T stops operating, since the torque steer phenomenon in the direction for assisting turning which is generated by the driving force distribution device T disappears, the result is that the steering force increases.

Line c corresponds to the case in which the operation of the driving force distribution device T is stopped based on the occurrence of a malfunction in a vehicle having an electric power steering device S and a driving force distribution device T and carrying out co-operative operation. In this case, as the operation of the driving force distribution device T stops, the torque steer phenomenon in the direction for assisting turning which is generated by the driving force distribution device T disappears and the steering force increases.

Line d corresponds to the case in which the operation of the driving force distribution device T is gradually stopped in a vehicle to which the above-mentioned line a relates. In this case, since the torque steer phenomenon in the direction for assisting turning which is generated by the driving force distribution device T gradually disappears, the steering force increases gradually rather than rapidly.

As hereinbefore described, if the operation of the driving force distribution device T continues when the electric power steering device S malfunctions, the steering force rapidly increases or decreases so that the driver experiences a disagreeable sensation (line b), but by stopping the operation of the driving force distribution device T at the aforementioned occurrence of a malfunction thus preventing the steering force from changing rapidly it is possible to lessen the disagreeable sensation experienced by the driver (line c). In particular, if the operation of the driving force distribution device T is gradually stopped at the aforementioned occurrence of a malfunction, the steering force changes more smoothly and the disagreeable sensation experienced by the driver can more effectively be lessened (line d).

Figure 10:
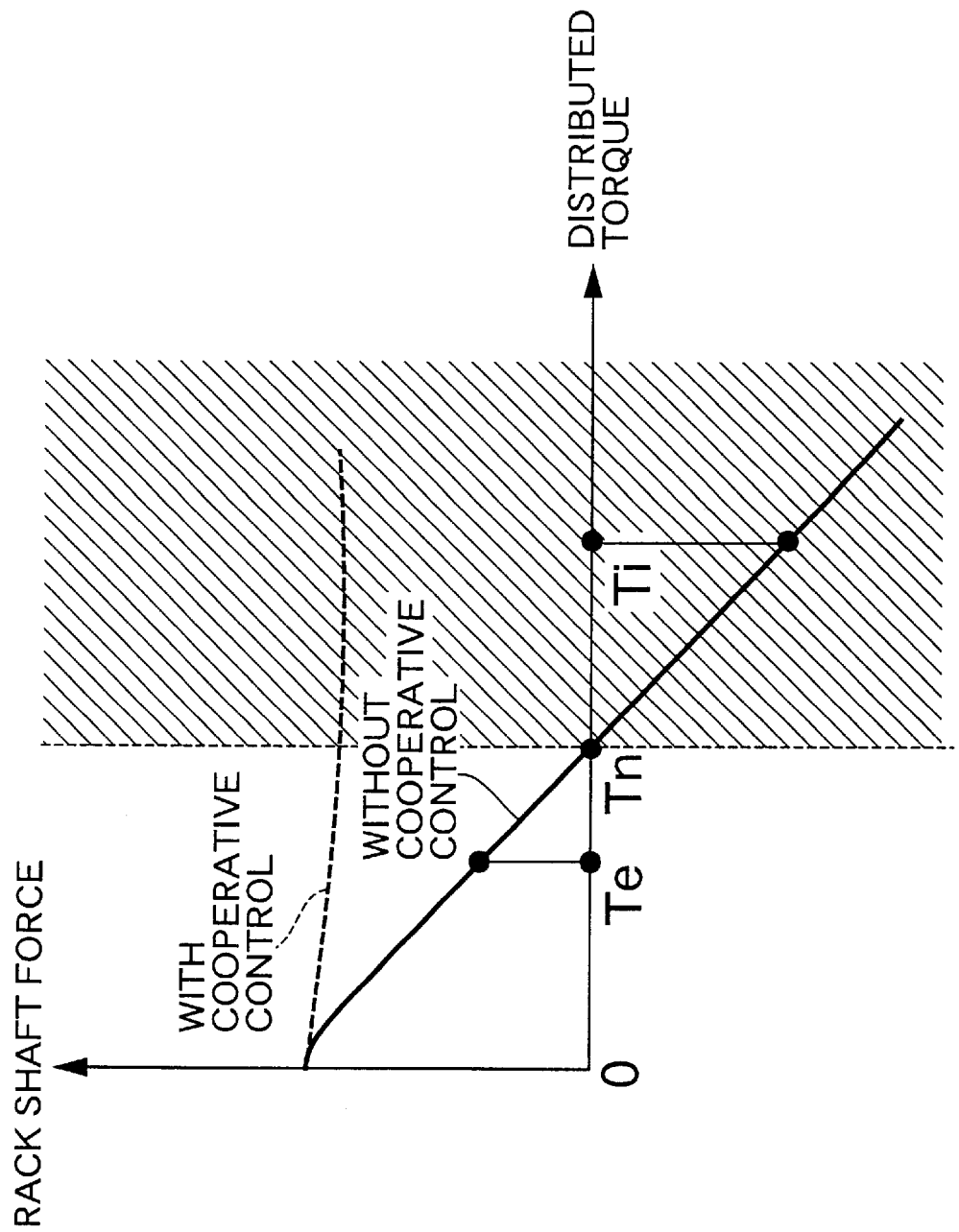

FIG. 10 shows the relationship between the distributed torque $T_L$, $T_R$ of the driving force distribution device T and the rack shaft force (i.e., the steering force) of the electric power steering device S when the vehicle is turning.

In the case where co-operative operation of the electric power steering device S and the driving force distribution device T is carried out (broken line), even when the distributed torque $T_L$, $T_R$ generated by the driving force distribution device T changes, so changing the strength of the torque steer, the rack shaft force is maintained at an almost constant level and the steering reaction experienced by the driver from the steering wheel is also maintained at an almost constant level. However, when the electric power steering device S malfunctions and co-operative control cannot be carried out, the rack shaft force changes to a great extent according to the distributed torque $T_L$, $T_R$ at that time solid line).

As hereinbefore described, since the torque steer phenomenon functions in the direction for assisting the turning of the vehicle (that is to say, the direction which decreases the steering force), when the distributed torque $T_L$, $T_R$ exceeds the reference distributed torque Tn, the value of the rack shaft force becomes negative. Therefore, in the case in which the electric power steering device S malfunctions and co-operative control cannot be carried out, the steering wheel receives a torque steer in the turning direction as a result of a negative rack shaft force, and there is a possibility that the driver might experience a strong disagreeable sensation (hatched area in FIG. 10).

Therefore, in the present embodiment when the electric power steering device S malfunctions in a state in which the distributed torque $T_L$, $T_R$ exceeds the aforementioned reference distributed torque Tn (e.g., in the state in which the distributed torque is Ti), the distributed torque $T_L$, $T_R$ is instantly decreased from Ti to Te and then gradually decreased from Te to 0. Te is pre-set so as to be smaller than the reference distributed torque Tn. Thus, when a malfunction occurs, by promptly departing from the state in which the distributed torque $T_L$, $T_R$ exceeds the reference distributed torque Tn, it is possible to prevent the steering wheel from receiving torque steer in the turning direction so lessening the disagreeable sensation experienced by the driver. Subsequently, by decreasing the distributed torque $T_L$, $T_R$ gradually from Te to 0 the state can be moved smoothly to the same state as that in a manually steered vehicle having no electric power steering device S.

Although the smaller the value of the aforementioned Te the more effectively the torque steer in the turning direction can be prevented, since there is a possibility that the distributed torque $T_L$, $T_R$ would change instantaneously by large amount so affecting the vehicle behaviour, it is desirable to determine the value of the aforementioned Te while considering the balance between them.

When a malfunction occurs in a state in which the distributed torque $T_L$, $T_R$ does not exceed the aforementioned reference distributed torque Tn, the distributed torque $T_L$, $T_R$ is decreased gradually from that state to 0.

As hereinbefore described, in accordance with the generic invention S hereof, when the electric power steering device or the second control means malfunctions, and as a result the torque steer phenomenon accompanying the operation of the force distribution device cannot be lessened, the first control means stops the operation of the force distribution device, so preventing the aforementioned torque steer phenomenon from occurring, and thus it is possible to prevent the driver from experiencing a disagreeable sensation.

In accordance with the first refinement of the invention, when the aforementioned malfunction occurs during the operation of the force distribution device, since the distributed force gradually decreases towards zero, a rapid change in the steering reaction, which is experienced by the driver from the steering wheel, can be prevented.

In accordance with the second refinement of the invention, since the distributed force is immediately decreased to a level smaller than a reference distributed force at which the rack shaft force becomes zero when a malfunction occurs, it is possible to prevent the occurrence of the torque steer phenomenon which turns the vehicle sharply towards the inside in the turning direction. Moreover, since the distributed force is subsequently decreased gradually towards zero, the steering reaction is prevented from changing rapidly.

The embodiment of the present invention has been described in detail above, but the present invention can be modified in a variety of ways without departing from the spirit and scope of the invention, as set forth in the appended claims.

For example, the driving force distribution device in the present invention is not limited to one in which the driving force is distributed between the right and the left wheels, but may be one in which the driving force is distributed between the front and the rear wheels. Furthermore, the present invention can also be applied to cases in which the braking force is distributed between the right and the left wheels or the front and the rear wheels, or in which both driving force and braking force are distributed between the right and left wheels or the front and rear wheels.

What is claimed is:

1. A co-operative control system for a vehicle, the system comprising:
    a force distribution device for distributing at least one force of a driving force and a braking force between a plurality of spaced apart wheels;
    a first control means for controlling the operation of the force distribution device;
    an electric power steering device having a motor for applying a steering assist torque to a steering system; and
    a second control means for calculating a motor control signal for driving the motor, based on at least a steering torque detected by a steering torque detecting means;
    wherein the first control means calculates a correction signal for correcting said motor control signal based on a distributed force generated by the force distribution device;
    the second control means drives the motor based on a corrected motor control signal obtained by correcting the motor control signal with the correction signal; and
    the first control means stops the operation of the force distribution device when either the electric power steering device or the second control means malfunctions.

2. A co-operative control system for a vehicle according to claim 1, wherein when malfunction of the electric power steering device or the second control means occurs during the operation of the force distribution device, the first control means gradually decreases the absolute value of the difference between the distributed forces of the force distribution device to the spaced apart wheels towards zero.

3. A co-operative control system for a vehicle according to claim 1, wherein when malfunction of the electric power steering device or the second control means occurs while the force distribution device is generating a distributed force, which is larger than a reference force at which the rack shaft force of the electric power steering device becomes zero without a correction by said correction signal, the first control means immediately decrease the absolute value of the difference between the distributed forces of the force distribution device to the spaced apart wheels to a level less than said reference force, and then gradually decreases the distributed forces towards zero.

4. A co-operative control system for a vehicle according to claim 1, wherein said second control means includes means for determining malfunction of at least one of the electric power steering device and the second control means.

5. A co-operative control system for a vehicle according to claim 4, wherein said malfunction determining means determines malfunction of at least one of said electric power steering device and the second control means based on actual motor and said steering torque detected by the steering torque detecting means.

* * * * *

UNITED STATES PATENT AND TRADEMARK OFFICE
CERTIFICATE OF CORRECTION

PATENT NO. : 6,360,153 B1
DATED : March 19, 2002
INVENTOR(S) : Shinmura et al.

It is certified that error appears in the above-identified patent and that said Letters Patent is hereby corrected as shown below:

Column 3,
Line 41, change "front-engine front-wheel" to -- front-engine/front-wheel --.
Line 50, change "gear Z" to -- gear 2 --.

Column 4,
Line 59, change "$W_{FR}, W_{FR}$" to -- $W_{FR}, W_{FL}$ --.

Column 5,
Line 37, change "$K_w$" to -- $K_W$ --.
Line 38, change "33" to -- × --.
Line 59, change "Δ1" to -- ΔI --.
Line 61, change "Δ1" to -- ΔI --.
Line 67, change "Δ1" to -- ΔI --.

Column 6,
Line 3, change "Δ1" to -- ΔI --.
Line 7, change "Δ1" to -- ΔI --.
Line 59, change "Is" to -- is --.

Column 7,
Line 42, delete "at".

Column 8,
Line 14, change "Δ1" to -- ΔI --.
Line 20, change "$T_O$" to -- $T_Q$ --.
Line numbered between 28 and 29, change "Δ1" to -- ΔI --.
Line numbered between 30 and 31, change "Δ1" to -- ΔI --.
Line numbered between 32 and 33, change "Δ1" to -- ΔI --.
Line 37, change "$IM_S$" to -- $I_{MS}$ --.
Line 39, change "$IM_S$" to -- $I_{MS}$ --.
Line 49, change "Δ1" to -- ΔI --.

UNITED STATES PATENT AND TRADEMARK OFFICE
CERTIFICATE OF CORRECTION

PATENT NO.    : 6,360,153 B1
DATED         : March 19, 2002
INVENTOR(S)   : Shinmura et al.

It is certified that error appears in the above-identified patent and that said Letters Patent is hereby corrected as shown below:

Column 9,
Line 4, change "$\Delta 1_{OS}$" to -- $\Delta I_{OS}$ --.
Line 7, change "$\Delta 1_{OS}$" to -- $\Delta I_{OS}$ --.
Line 8, change "$\Delta 1 (\Delta 1 = \Delta 1_{OS})$" to -- $\Delta I (\Delta I = \Delta I_{OS})$ --.
Line 13, change "$\Delta 1_{OS}$" to -- $\Delta I_{OS}$ --.
Line 48, change "drivers" to -- driver's --.

Column 10,
Line 18, change "$\Delta 1$" to -- $\Delta I$ --.
Line 28, change "$\Delta 1$" to -- $\Delta I$ --; change "$\Delta 1_{OS}$" to -- $\Delta I_{OS}$ --.
Line 31, change "$\Delta 1$" to -- $\Delta I$ --.
Line 41, change "$I_{Ms}{'}$" to -- $I_{MS}{'}$ --.

Column 11,
Line 42, change "line a" to -- line c --.

Column 12,
Line 9, before "solid" insert -- ( --.
Line 44, before "large" insert -- a --.
Line 52, after "invention" delete "S".

Signed and Sealed this

Eighth Day of October, 2002

Attest:

JAMES E. ROGAN
*Attesting Officer*    *Director of the United States Patent and Trademark Office*